United States Patent [19]

Wilhelmsen

[11] 4,029,355

[45] June 14, 1977

[54] TRUCK BODY TAIL GATE

[76] Inventor: Irven R. Wilhelmsen, 6359 Dominica St., Cypress, Calif. 90630

[22] Filed: Sept. 29, 1975

[21] Appl. No.: 617,424

[52] U.S. Cl. .................. 296/57 R; 108/134; 182/91; 248/240; 280/166
[51] Int. Cl.² .................. B62D 25/00
[58] Field of Search ............ 296/57 R, 57 A, 58, 296/59, 60, 61, 62; 280/166, 163; 248/240, 240.4; 108/134; 182/91

[56] References Cited

UNITED STATES PATENTS

| | | | |
|---|---|---|---|
| 338,545 | 3/1886 | Noyes | 296/58 |
| 1,883,473 | 10/1932 | Barrett | 296/57 R |
| 1,953,298 | 4/1934 | Goodwin | 182/91 |
| 2,742,317 | 4/1956 | Chandler | 296/57 R |
| 3,421,458 | 1/1969 | Salkoff | 108/134 |

*Primary Examiner*—Joseph F. Peters, Jr.
*Assistant Examiner*—John A. Carroll

[57] ABSTRACT

The structure disclosed embraces a pair of vertical angle iron brackets welded to the rear ends of side walls of a truck service body in the plane of the rear end opening of the latter. A rectangular sheet metal tail gate having tapering end flanges welded thereto, the latter being provided with upper and lower pairs of laterally extending bolts, the lower pair of which extend laterally into vertical slots in the lower portions of said brackets and the upper pair of which extend laterally into notches formed in the upper ends of said brackets. The tail gate is normally held in vertical position closing the rear end of the truck body and is adapted to be readily shifted to horizontally rearwardly extending position by lifting said tail gate to remove the upper bolts from said notches and then swinging it downwardly until the wider lower ends of said end flanges abut against lower end portions of said brackets, this rigidly supporting the tail gate horizontally.

2 Claims, 4 Drawing Figures

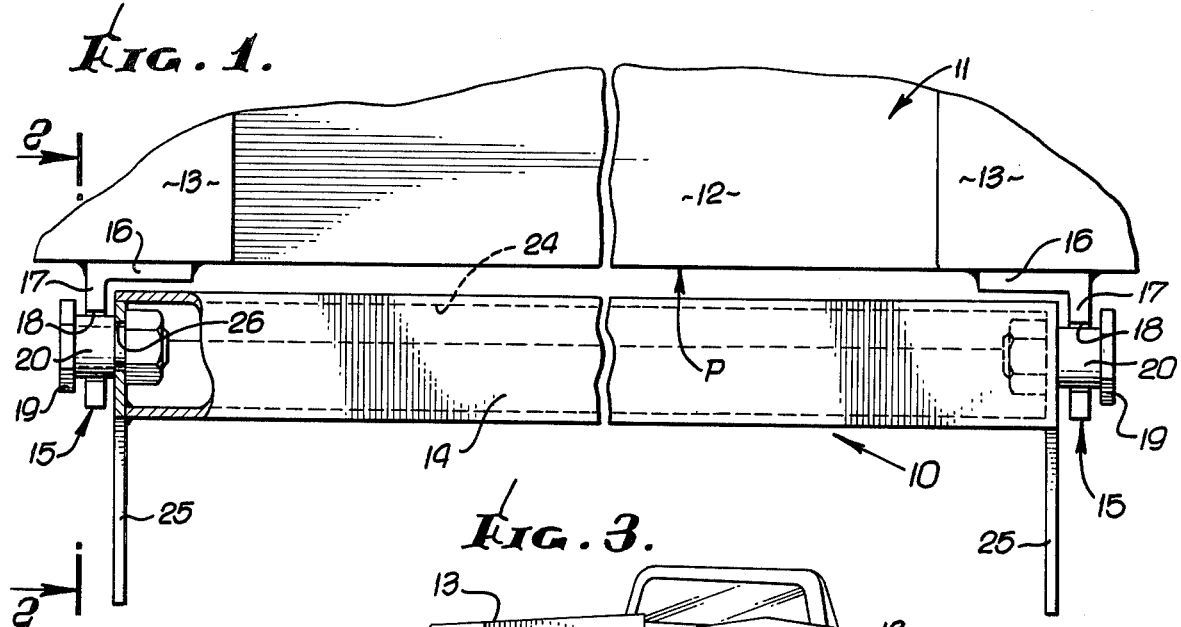
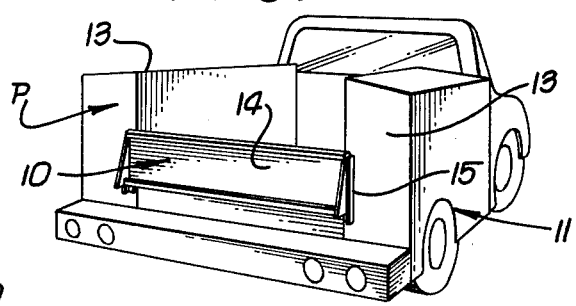
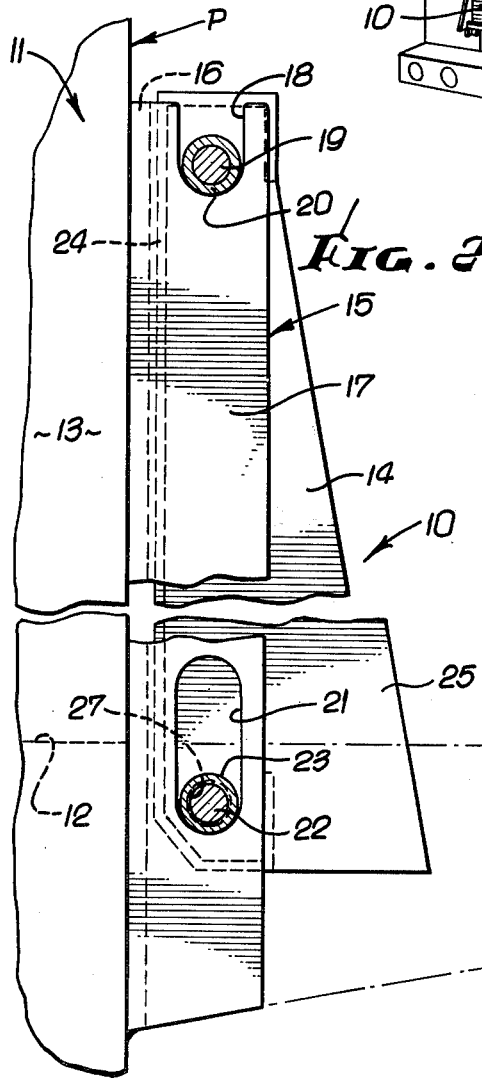
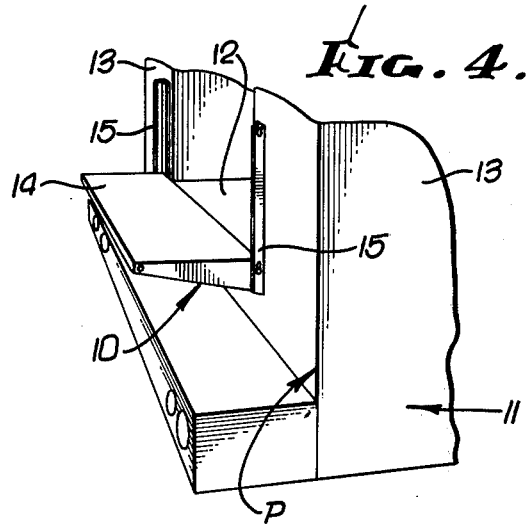

TRUCK BODY TAIL GATE

SUMMARY OF THE INVENTION

It is a primary object of the present invention to provide a simple truck body tail gate structure which can be secured as a unit by a simple welding operation to the rear end of any of a vast variety of designs of service truck bodies so as to perform the function of a tail gate and be readily shiftable manually to form a horizontal rearward extension of the floor of the truck body when such becomes desireable for loading or unloading the truck.

BRIEF DESCRIPTION OF THE DRAWINGS

FIG. 1 is a fragmentary plan view, partly broken away, and illustrates a preferred embodiment of the present invention with the tail gate thereof in vertical position.

FIG. 2 is a fragmentary vertical sectional view taken on the line 2—2 of FIG. 1, the tail gate being shown in vertical position in full lines and in horizontal position in broken lines.

FIG. 3 is a fragmentary perspective view illustrating the tail gate of the invention disposed vertically.

FIG. 4 is a perspective view showing said tail gate extended rearwardly in horizontal extension of the truck body floor.

DETAILED DESCRIPTION OF THE PREFERRED EMBODIMENT

The tail gate assembly structure 10 of the invention is incorporated with the rear end of a special truck body 11 having a bed 12 and side walls 13 which end rearwardly in a single vertical transverse plane P. The tail gate 14 is supported on a pair of vertical angled brackets 15, webs 16 of which are welded to the back surfaces of the side walls 13 with webs 17 of said brackets extending rearwardly from outer edges of the webs 16. Upper ends of webs 17 of the brackets 15 are provided with notches 18 for receiving bolts 19 fitted with sleeves 20. Elongated slots 21 are provided in lower portions of the webs 17 for receiving similar bolts 22 having sleeves 23.

The tail gate 14 comprises a sheet metal plate 24 approximately 16 × 51 inches reversely bent as shown along its upper and lower edges for reinforcing purposes and having tapering side flange plates 25 welded to the opposite ends of the plate 24 thus bent. Upper and lower end portions of plates 25 are provided with holes 26 and 27 in which bolts 19 and 22 respectively are received so as to mount the tail gate 14 on the brackets 15. The tail gate 14 is shown in full lines in the drawings in its vertical position closing the space just above the truck bed 12 between the side walls 13. To open the tail gate 14, this is merely lifted to raise the bolts 19 above the upper ends of the notches 18, thus permitting the gate to be swung outwardly and downwardly about the bolts 22 into its broken line position shown in FIG. 2 in which the upper surface of the tail gate 14 is supported to lie on the same horizontal level as the upper surface of the truck bed 12, by the wider lower ends of the tapering side flange plates 25 coming into vertical abutment against the rear vertical faces of webs 16 of angled gate mounting brackets 15.

The claims are:

1. In a tail gate structure adapted to be applied as a unit exclusively to a transverse vertical plane provided by the rear end faces of the side walls of the bed of a truck service body, the combination of:
   a pair of vertical right angle sheet metal brackets having primary aligned webs extending inwardly and secured by welding means to said side wall end faces and having parallel secondary webs extending rearwardly from outer edges of said primary webs, said secondary webs having a pair of aligned notches in their upper ends and a pair of aligned slots near their lower ends;
   a rectangular tail gate formed of sheet metal to fit between said secondary webs and having upwardly tapered parallel sheet metal flanges welded to its opposite ends, the latter flanges being bolt-hole apertured opposite said notches and slots; and
   two pair of bolts with spacing sleeves, said bolts penetrating said apertures with said sleeves extending through and occupying said notches and slots in said secondary webs,
   said tail gate being supported vertically by said bolts, the upper bolts being liftable from said notches to permit the tail gate being swung downward into horizontal rearward extension of said truck bed, the tail gate being supported in its lower horizontal position by said lower pair of bolts and by the wide lower ends of said tapered end flanges abutting flush against lower end portions of said vertical primary bracket webs.

2. A combination as recited in claim 1 wherein said tail gate is rearwardly bent along its upper and lower edges for reinforcement purposes so as to be received between and be welded to corresponding ends of said sheet metal end flanges, the lower edge of said tail gate being bevel-bent to allow said tail gate to freely rotate about said lower bolts between its vertical and horizontal positions.

* * * * *